US009090341B2

(12) United States Patent
Edmond et al.

(10) Patent No.: US 9,090,341 B2
(45) Date of Patent: Jul. 28, 2015

(54) AIRCRAFT LIGHTING DEVICE

(75) Inventors: George Edmond, Yatton (GB); Thomas Monaghan, Croydon (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 13/561,472

(22) Filed: Jul. 30, 2012

(65) Prior Publication Data

US 2013/0048793 A1 Feb. 28, 2013

(30) Foreign Application Priority Data

Aug. 31, 2011 (GB) .................................. 1115026.5

(51) Int. Cl.
  *B64C 23/06* (2006.01)
  *B64D 47/02* (2006.01)

(52) U.S. Cl.
  CPC .............. *B64C 23/065* (2013.01); *B64D 47/02* (2013.01); *Y02T 50/164* (2013.01)

(58) Field of Classification Search
  CPC ............................ B64C 23/065; Y02T 50/164
  USPC ...................... 244/199.4, 199.1, 91
  See application file for complete search history.

(56) References Cited

U.S. PATENT DOCUMENTS

| 2,375,075 | A | * | 5/1945 | Carruth | 362/470 |
| 2,832,059 | A | * | 4/1958 | Adler, Jr. | 340/982 |
| 4,205,810 | A | * | 6/1980 | Ishimitsu | 244/91 |
| 4,776,542 | A | * | 10/1988 | Van Dam | 244/198 |
| 5,275,358 | A | * | 1/1994 | Goldhammer et al. | 244/91 |
| 5,348,253 | A | * | 9/1994 | Gratzer | 244/91 |
| 5,416,672 | A | * | 5/1995 | Authier | 362/470 |
| 5,719,568 | A | * | 2/1998 | Adams | 340/961 |
| 6,484,968 | B2 | * | 11/2002 | Felker | 244/91 |
| 6,669,357 | B2 | * | 12/2003 | Konicke et al. | 362/470 |
| 6,796,533 | B2 | * | 9/2004 | Barrett et al. | 244/208 |
| 6,886,778 | B2 | * | 5/2005 | McLean | 244/45 R |
| 6,963,293 | B1 | * | 11/2005 | Rast | 340/981 |
| 7,175,321 | B1 | * | 2/2007 | Lopez | 362/496 |
| 2010/0201951 | A1 | | 8/2010 | Budinger et al. | |

FOREIGN PATENT DOCUMENTS

| FR | 2 860 493 A1 | 4/2005 |
| WO | 2005075288 A1 | 8/2005 |
| WO | 2010025490 A1 | 3/2010 |

OTHER PUBLICATIONS

A United Kingdom Search Report dated Dec. 15, 2011 for GB Application No. 1115026.5.

* cited by examiner

*Primary Examiner* — Brian M O'Hara
*Assistant Examiner* — Keith L Dixon
(74) *Attorney, Agent, or Firm* — Lowe Hauptman & Ham, LLP

(57) ABSTRACT

A wing tip device has a lighting device arranged to project from a spanwise portion onto a substantially vertical portion of the wing tip device.

14 Claims, 3 Drawing Sheets

AIRCRAFT LIGHTING DEVICE

RELATED APPLICATIONS

The present application is based on, and claims priority from, Great Britain Application Number 1115026.5, filed Aug. 31, 2011, the disclosure of which is hereby incorporated by reference herein in its entirety.

The present invention is concerned with an aircraft lighting device. More specifically, the present invention is concerned with an aircraft wing tip device and associated lighting arrangement for illumination of the fuselage-facing side of the wing tip device.

Wing tip devices are becoming increasingly common on commercial aircraft. Aside from the reduction of lift induced drag caused by wing tip vortices, wing tip devices also offer a vertically oriented area of the aircraft on which to place advertising and logos. In particular, the inward, fuselage-facing side of the wing tip device is visible to the passengers throughout the flight.

It is generally desirable to illuminate the surfaces of the wing tip device in poorly lit conditions, to improve visibility.

Because wing tip devices are often designed into existing airframes, there is limited ability to integrate illumination devices on the wing itself in order to project onto the fuselage facing side of the wing tip device. As such, in dark conditions, the logo and/or advertising on the wing tip device is not visible.

A solution for wing tip fuselage facing side illumination has been proposed in which light is projected from the fuselage. This is problematic as a light of significant power is required to reach the wing tip device, modifications required to the fuselage, alignment is difficult at such distances and furthermore the amount of light pollution and wasted energy created by such a device is significant.

It is an object of the present invention to provide an apparatus capable of illumination of the fuselage-facing side of a wing tip device.

According to the present invention there is provided a wing tip device comprising:
 a wing tip attachment formation,
 a first portion extending from the wing tip attachment formation and configured to extend in a substantially span wise direction in use,
 a second portion extending to a free end of the wing tip device and configured to extend at a non-zero angle relative to the first portion,
 a lighting device mounted with the first portion and arranged to project light towards a surface of the second portion.

By integrating the lighting device within the wing tip device itself, the unit does not require any modification to be made to the aircraft main wing or fuselage. By providing the lighting device in the first portion of the wing tip device, better illumination of the surface of the second portion is possible.

Preferably the lighting device defines an external surface, which external surface is flush with an external surface of the first portion.

More preferably the lighting device comprises a glazing component arranged to form a substantially uninterrupted aerodynamic surface with the eternal surface of the first portion.

Preferably the lighting device comprises a removable module comprising an electrical controller and illumination means.

Preferably the removable module is sealed and comprises a first electrical connector for connection to an electrical supply of an aircraft.

Preferably the first portion of the wing tip defines a module receiving formation comprising a second electrical connector.

Preferably the first and second electrical connectors are fixed.

Preferably the first and second electrical connectors comprise a bayonet, touch or spring loaded contact.

Preferably the first portion defines a lighting device receiving formation, and in which the lighting device and receiving formation are configured to permit installation of the lighting device in the receiving formation in a single orientation only.

Preferably the lighting device comprises a directional illumination means, and in which the orientation of the illumination means is adjustable.

The adjustment may be manual or via an electrical actuator.

Preferably the lighting device comprises LEDs.

An example aircraft wing tip device assembly will now be described with reference to the accompanying figures in which.

Figure 1:
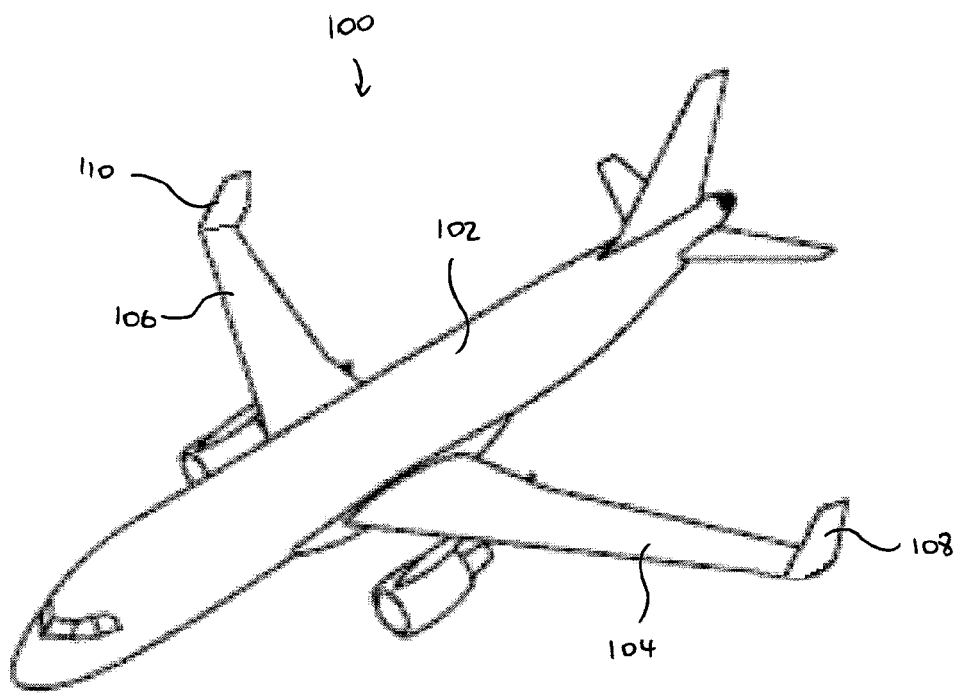
FIG. 1 is a perspective view of an aircraft comprising an aircraft wing tip device assembly according to the present invention.

Turning to FIG. 1, there is provided an aircraft 100 comprising a fuselage 102, a left wing 104 and a right wing 106. Each of the wings 104, 106 comprises a substantially vertically oriented wing tip device (winglet) 108, 110 respectively.

Figure 2:
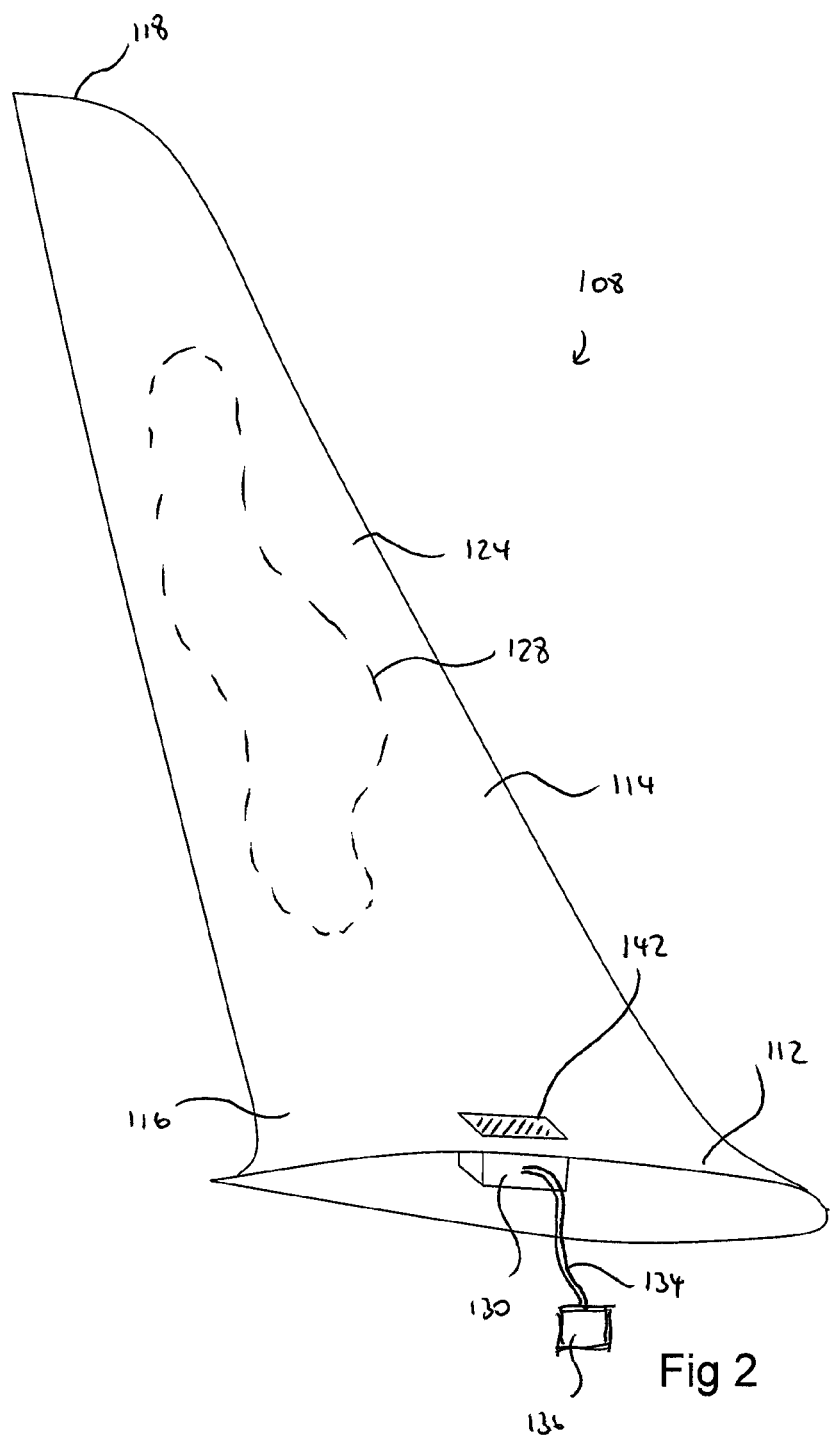
FIG. 2 is a perspective view of a wing tip device in accordance with the present invention.
Figure 3:
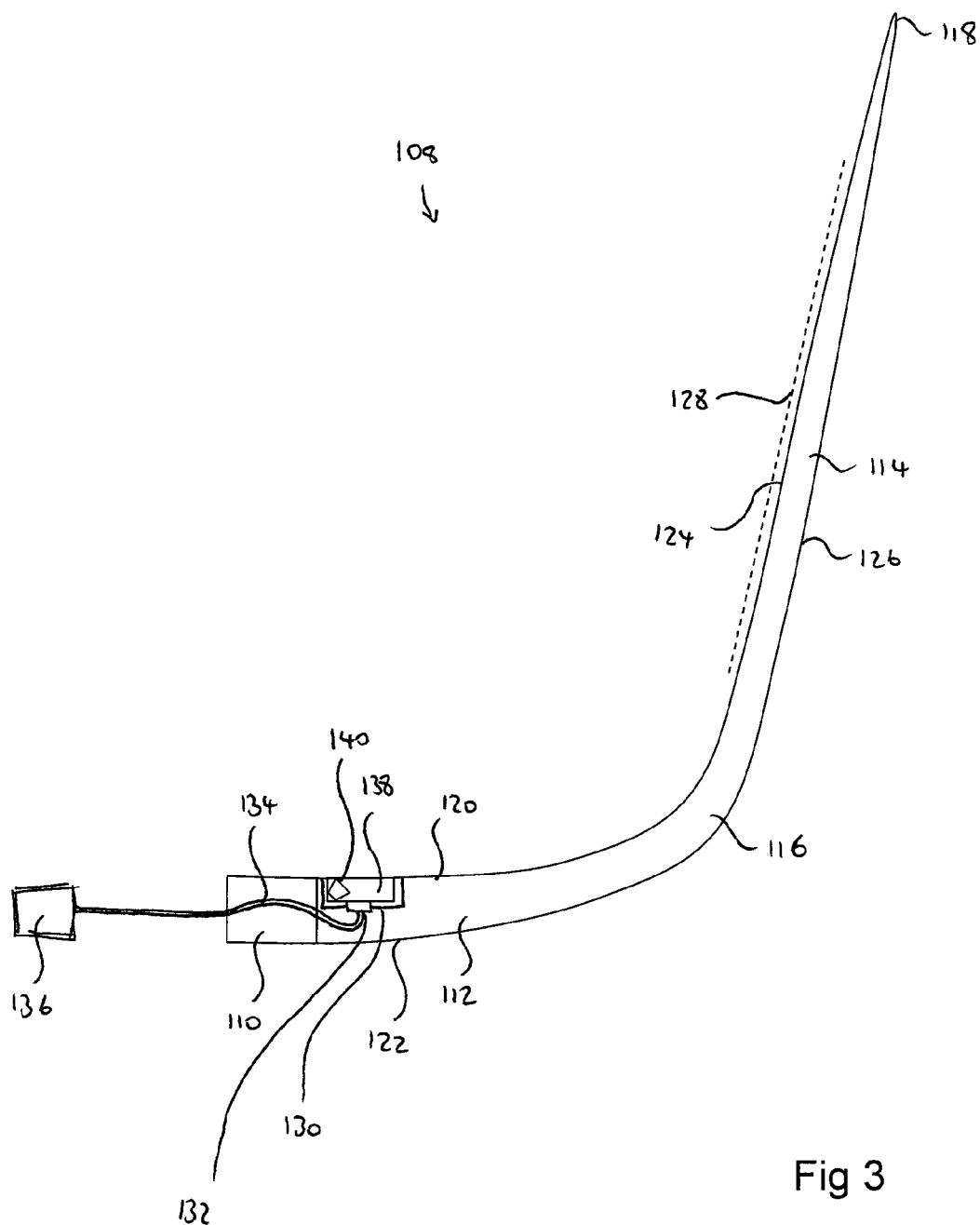
FIG. 3 is a side section view of a wing tip device in accordance with the present invention.

The wing tip devices 108, 110 are identical (albeit mirror images) and, as such, only the wing tip device 108 will be described in detail as show in FIGS. 2 and 3.

The wing tip device 108 comprises a wing tip attachment formation 110 (not shown in FIG. 2) which comprises the necessary mechanical formation and attachment means (not described here) for attachment to the end of the tip of the wing 104.

Extending from the attachment device 110, there is defined a first wing tip portion 112 extending in substantially a span-wise direction. A second wing tip portion 114 extends at an angle to the first portion 112 (usually between 50 and 80 degrees thereto and substantially vertically in use) and is connected to the first portion 112 via a blended curved section 116. The second portion 114 extends to a free end 118 of the wing tip device.

The first portion 112 comprises an upper surface 120 and an opposite lower surface 122. Similarly, the second portion 114 comprises an inward facing surface 124 which faces the fuselage 102 and an outward facing surface 126 which faces away from the fuselage 102.

The inward facing surface 124 defines advertising or a logo 128 which is intended to be visible to the passengers within the fuselage 102.

The first portion 112 defines a lighting device receiving formation 130 comprising a cavity having an electrical connector 132 installed in a fixed position therein, which electrical connector is connected via a cable 134 to the aircraft control systems 136.

The connector 132 is of a known type and comprises a male or female type connection with an easy-fit formation such as a snap-fit or bayonet type connector.

A lighting device 138 is provided comprising a self-contained unit having a lamp array 140 contained therein and a flat glazing panel 142 installed thereover. The lighting device 178 is insertable into the lighting device receiving formation 130. The lighting device 138 comprises a further connector (not visible) which is configured to engage with the connector 132 such that power and/or control signals can be delivered to the lamp array 140.

The lamp array 140 is positioned at an angle suitable for illuminating the face 124 and therefore the advertising or logo 128. As such, the lamp array 140 may be oriented at an angle of 30 to 70 degrees to the horizontal, thus providing a directed light beam onto the surface 124. The lamp array 140 comprises a series of LED lamps.

It will be noted that the lighting device 138 may be entirely self-contained and may include a separate power supply. More preferably, however, the lighting device 138 makes use of the aircraft's power systems but contains all the necessary electrical equipment to control the lamp array 140.

The glazing component 142 is arranged to form a flush fit with the first portion 112 and, in particular, with surface 120 such that a smooth aerodynamic surface is maintained across the wing tip device 108 and therefore aerodynamic performance is not detrimentally affected by the presence of the lighting device 138.

The glazing component 142 is preferably transparent or may be translucent in order to diffuse the light from the lamp array 140 as required.

The lighting device 138 and the lighting device receiving formation 130 are configured so that the device 138 is insertable in a single orientation only. As such, upon installation it would be extremely difficult to install the device incorrectly such that the lamp array 140 does not point towards the surface 124.

The lamp array 140 may be movable in use by manual or electronic means such that the light beam emitted therefrom may be directed to different parts of the surface 124 depending on the type of logo or advertising 128 disposed thereon.

Variations fall within the scope of the present invention.

As well as being retained in position by the electrical connectors, the lighting unit 138 may be retained by clips and/or a snap-fit of the glazing component 142 with the surrounding componentry. Alternatively, the glazing may be installed via adhesive or hermetically sealed, or even integrally moulded during the manufacturing process.

The lighting device 138 may also include a heat sink within the winglet (wing tip device) to distribute heat away from the lamp array 140.

Preferably the light lamp array 140 comprises an array of LED light heads to give uniform coverage of the advertising or logo 128.

As well as being particularly shaped to suit the lamp device receiving formation, the light device 138 may provide an index formation (for example, a male lug which fits with a female lug within the light device receiving formation 130).

Other light sources may be used instead of an LED, however, LEDs are preferable.

The invention claimed is:

1. A passenger aircraft winglet, comprising:
    a wing tip attachment formation,
    a first portion extending from the wing tip attachment formation and configured to extend in a substantially span wise direction in use,
    a blended curved section;
    a second portion connected to the first portion via the blended curved section, the second portion extending to a free end of the winglet and configured to extend at a non-zero angle relative to the first portion such that the second portion extends substantially vertically in use and such that a surface of the second portion faces an aircraft fuselage in use,
    a lighting device mounted with the first portion and arranged to project light onto the surface of the second portion such that the surface is visible from the aircraft fuselage in use, and wherein the lighting device defines an external surface, which external surface is flush with an external aerodynamic surface of the first portion.

2. A winglet according to claim 1 in which the lighting device comprises a glazing component arranged to form a substantially uninterrupted aerodynamic surface with the external aerodynamic surface of the first portion.

3. A winglet according to claim 1 in which the lighting device comprises a removable module comprising an electrical controller and illumination means.

4. A winglet according to claim 3 in which the removable module is sealed and comprises a first electrical connector for connection to an electrical supply of an aircraft.

5. A winglet according to claim 4 in which the first portion of the wing tip defines a module receiving formation comprising a second electrical connector.

6. A winglet according to claim 5 in which the first and second electrical connectors are fixed.

7. A winglet according to claim 5 in which the first and second electrical connectors comprise a bayonet, touch or spring loaded contact.

8. A winglet according to claim 1 in which the first portion defines a lighting device receiving formation, and in which the lighting device and receiving formation are configured to permit installation of the lighting device in the receiving formation in a single orientation only.

9. A winglet according to claim 1 in which the lighting device comprises a directional illumination means, and in which the orientation of the illumination means is adjustable.

10. A winglet according to claim 9 in which the adjustment is manual.

11. A winglet according to claim 10 in which the adjustment is via an electrical actuator.

12. A winglet according to claim 1 in which the lighting device comprises LEDs.

13. A winglet according to claim 1, in which the lighting device comprises a removable module comprising illumination means, which lighting device is insertable and removable from an exterior aerodynamic surface of the winglet.

14. A winglet according to claim 13, in which the external surface of the removable module is arranged to form a substantially uninterrupted aerodynamic surface with the external aerodynamic surface of the first portion.

* * * * *